Jan. 17, 1933.  J. ZENZ ET AL  1,894,916
VEHICLE BRAKE TESTER
Filed Oct. 6, 1930
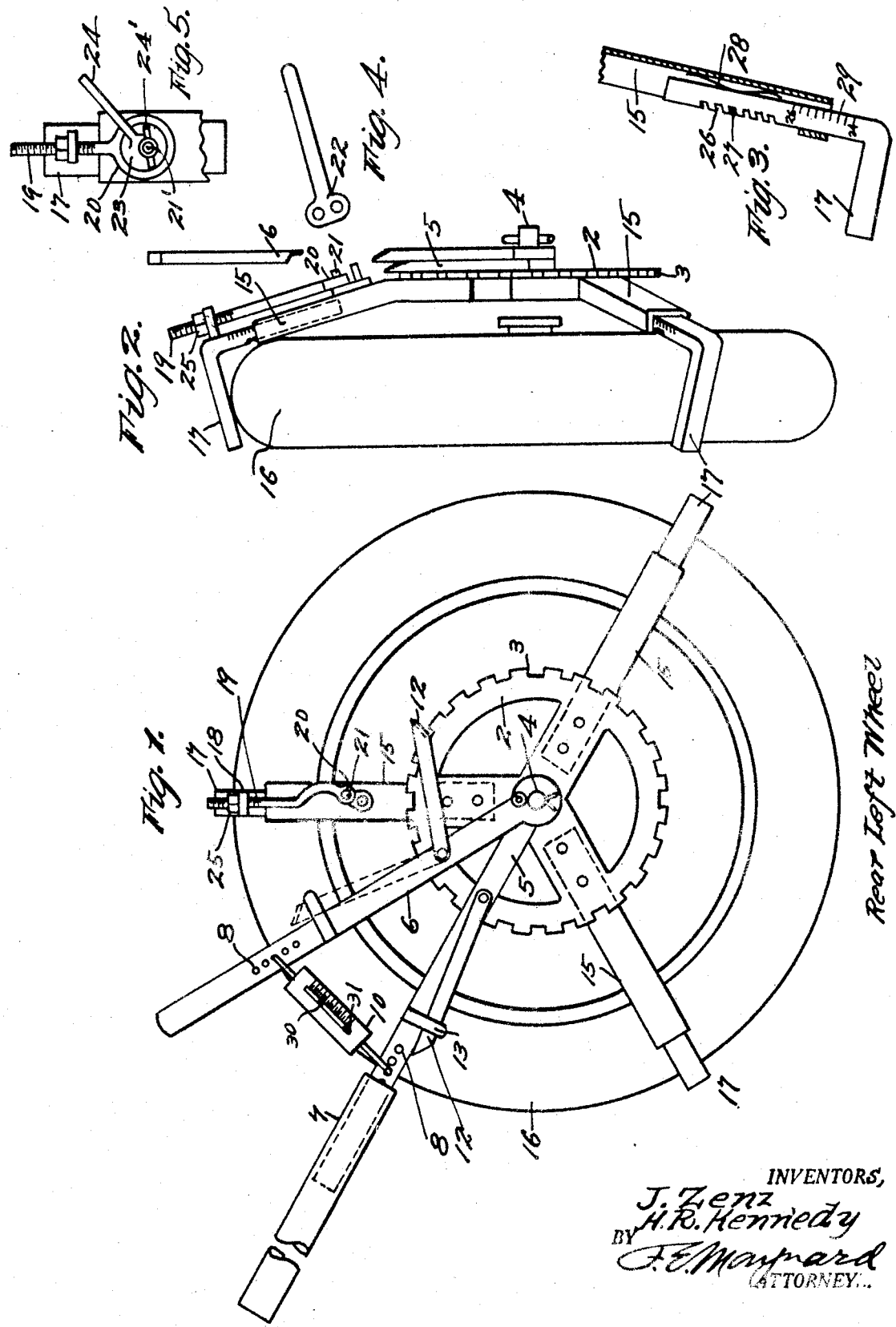
INVENTORS,
J. Zenz
H. R. Kennedy
BY
F. E. Maynard
ATTORNEY Patented Jan. 17, 1933

1,894,916

UNITED STATES PATENT OFFICE

JOHN ZENZ AND HOMER R. KENNEDY, OF LOS ANGELES, CALIFORNIA; SAID ZENZ ASSIGNOR TO SAID KENNEDY

VEHICLE BRAKE TESTER

Application filed October 6, 1930. Serial No. 486,636.

This invention relates to apparatus for testing the resistance of a brake when set to hold a wheel of a vehicle.

It is a general object to provide a brake tester which may be easily applied and operated for testing of various types of automotive road vehicles and motorless trailers while the wheels to be tested are in a jacked up position allowing rotation by the testing means.

A further object is to provide a manually powered tester of simple form, low cost, material range of adjustment so as to be applied to various sizes of tires of wheels, and which is capable of effective use by any ordinary mechanic, or vehicle owner or driver, so as to ascertain the frictional effort of the brakes of a vehicle.

An additional object is to provide a brake tester which, when applied, has contact only with the rubber tire of the wheel and is positively held out of contact with other elements of the wheel so that the finish and parts are not marred by abusive mechanics using the tester.

Another purpose is to provide a tester which is adapted for equally efficient use on either right or left side wheels.

A purpose is to provide a tester which is devoid of gear and motor mechanism and which when in use is wholly supported by the wheel being tested, and is of such a character that it may be considered as a hand tool and become a regular part of an automobile mechanic's kit, and equipment of home and other garages.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a side elevation of the tool as applied to a left-hand wheel of a vehicle.

Figure 2 is a tread-view of a tire and its applied tester.

Figure 3 is a detail view of one of the preliminarily adjustable tire grabs of the tool.

Figure 4 is a plan of a wrench for clinching up the binder grab.

Figure 5 is a plan of a modified form of binder grab setting means.

The tool comprises a simple ring 2 having ratchet teeth 3 in its rim and is provided with an axial trunnion 4 on which is loosely journaled a pair of handle arms 5 and 6.

These arms can be effectively extended in length by a transferable socket bar 7 adaptable to either arm. Each arm has a row of perforations 8 and the arms are linked together by a suitable type of spring scale 10 whose end hitches are hooked into directly opposite holes 8 as determined by the tread diameter of tire on a wheel being tested so that when the scale is tensioned between the arms 5 and 6 the indicator shows in pounds (or other unit) the degree of force on the tread moment, as to the axle, needed to overcome the wheel brake (not shown).

Each arm 5—6 has a pawl 12 which can be retained out of commission by a spring keeper 13 or can be released so as to engage the ratchet 2, according to whether right or left wheels are to be tested.

The ratchet 2 is provided with a set of three radial rigid horns 15, equispaced, and bent rearward toward the wheel side so as to bear against the wall of the tire 16, as shown in Fig. 2. One horn is disposed vertically and has a telescopic hook or grab 17 bent over so as to contract on to the tire 16. This grab is mechanically shifted by a suitable device which will also serve to lock it in contracted position against the opening reaction of the grabbed rubber tire. In Fig. 1 the grab 17 is shown as having a spur 18 through which passes a threaded bolt 19 having an eye 20 on a crank pin 21 which is engageable by a spanner wrench 22 by which the eye end of the bolt can be thrown around the crank center to draw in the grab 17. When the eye is past center the bolt is locked against opening action of the clinched tire.

Figure 5 shows a form in which the eye 20 is hung on an eccentric 23 which has a lever handle 24.

The eye bolt 19 has a nut 25 to permit relative adjustment of the grab 17.

The two remaining and lower horns receive telescopic grabs 17, having inner notched edges 26 to hook on a cross-bar 27, Fig. 3 and against which they are pressed by springs 28 interposed in the horns for such purpose. The grabs 17 are provided with tire size indexes 29 and are set in proper position in the horns before the tool is applied to the tire, as also is the top grab 17, by adjustment of the nut 25.

When a given size tire is to be grappled the grabs are first adjusted in the horns to the size position and then the tool is pushed into place on the wheel while the top grab 17 is still extended, then the user, by wrench (22 or lever 24) contracts the top grab 17 in its horn 15 with the result that all of the grabs clinch in an equal degree on the tire tread so as to eliminate skidding action about the tire.

The operator now applies a pawl 12 (according to which lever 5 or 6 is to be connected) to the ratchet 2 and the slip handle 7 is applied to the other lever, as 5, Fig. 1; the scale 10 being hitched to the levers at relative holes 8—8, selective according to tire diameter. Now by pulling down on the lever 7—5 the scale shows the force required to slip the wheel against brake hold. A free pointer 30 when shifted to the highest degree reached by the pull force, will remain while the running pointer 31 will recede to zero. By shifting the tool to get a new bite of the pawl 12 on the ratchet 2 the wheel can be turned step by step, or if desired the wheel can be pulled around with continuous motion in one way to feel out brake binding spots.

To release the tool it is only necessary to let out the top hitching grab 17 and this will free the device so that it can be drawn away from the wheel.

The eccentric lever 24 can be locked at any point in its sweep by setting up the wing nut 24' on the center stud 21'.

An important feature of this tool is that it is designed to be applied to various forms of wheel structures of the solid disc, the wooden spoke, and the wire spoke types.

It is known that a greater effort is needed to initiate wheel rotation, while under brake, than is needed to maintain such rotation once the standing or resistance of inertia has been overcome. Therefore, the wheel may be started by first pulling on lever 6 direct to link 12 and to ratchet disc 2, and as soon as the inertia and standing resistance of the brake is overcome then the operator shifts his effort to the lever 5 whose action is through the scale 10 to lever 6. Hence the scale will show, not the resistance of standing brake hold, but the resistance of the brake upon the drum while this is slipping in the brake. This mode of use of the tool thus eliminates the fluctuating action resulting from high "still hold" of the brake to the lesser resistance during drum slip in the brake.

What is claimed is:

1. A device for testing the turning resistance of wheels, of road vehicles, in place on their axles, comprising a ratchet ring having a tire gripping means consisting of equi-spaced horns which are immovably fixed to the said ring and have, each, a rearwardly bent part, an angular tire grab telescopically mounted on each of said bent parts, clinching means operative to effectively set the grabs on the tire, a pair of levers operatively independent of the ring and having a pivot on the axis thereof, a link scale connecting said levers, and means for connecting one of the levers to the ring.

2. A device for testing the turning resistance of wheels, of road vehicles, in places on their axles, comprising a ratchet ring having a tire gripping means consisting of equi-spaced horns fixed to said ring and including, each, a rearwardly bent part, a tire grab telescopically mounted on each of said parts, means to clinch the grabs on a tire, a pair of levers operatively independent of the ring and having a pivot coaxial therewith, a link scale connecting the levers; said grabs including independent hook members to reach across the wheel tire and adapted for separate preliminary size adjustment, one of said members carrying said clinching means to contract it onto the tire, and means for connecting one of the levers to the ring.

3. A device for testing the resistance of wheels, of road vehicles, in place on their axles, comprising a ratchet ring having a tire gripping means consisting of a set of horns fixed to the ring and having, each, a rearwardly bent part, a sliding tire grab on each of said parts, clinching means to set the grabs on the tire, a pair of levers operatively independent of the ring and having a pivot coaxial therewith, a link scale connecting said levers, and means to connect either the linked levers to the ring.

4. A vehicle brake action tester consisting of a tool having tire clinching means adapted for application to right or left wheels at will, force measuring means combined with the clinching means and including a pair of lever arms having a common trunnion on said clinching means, a scale device coupling the levers, and selective means to connect either of said arms to the clinching means, according to application of the tool to right or left wheel.

5. A vehicle wheel, brake action tester consisting of a tool having tire clinching means adapted for application to right or left wheels at will, force measuring means combined with the clinching means and including a pair of lever arms having a pivot on said clinching means, a scale device connecting said arms, and selective means to connect either of said arms to the clinching means according to use on right or left wheel; said clinching means including a set of rigid horns having telescopic grabs which are independently adjustable.

6. A vehicle wheel, brake action tester consisting of a tool having tire clinching means applicable to either right or left wheels at will, force measuring means combined with the clinching means and including a pair of lever arms having a common pivot on said means, a power measuring device connecting the arms, and selective means to connect either of said arms to the said means according to necessary direction of rotation of the tool and wheel; said means including a set of rigid horns and independently adjustable grabs on said horns.

7. In a vehicle wheel brake testing tool, a rigid set of tire grab horns including telescopic hook arms independently adjustable for preliminary application to a wheel, and toggle clinching means mounted on one horn and connected to its adjustable arm and whereby all of the adjusted arms are concurrently set to clinch a tire.

8. A brake tester including a ratchet ring having a trunnion, free levers mounted on the trunnion, a force scale linking the levers, means to reversibly connect the levers to the ring for pulling effect, selectively, in one direction or the other, and means to clinch the ring to a wheel tire for brake test.

9. A vehicle brake action tester consisting of a ratchet disc adapted to be set clear of the wheel elements and having means to adjustably clinch upon a tire of the wheel, and means for turning the clinched tire and including a lever having positive connection with the disc to initiate wheel motion under brake resistance, a second lever and force indicating means connecting the levers, and means for positively connecting the second lever with and to turn the disc; the latter being turnable in either direction by said levers.

JOHN ZENZ.
HOMER R. KENNEDY.